(12) United States Patent  
Iwakawa et al.

(10) Patent No.: US 7,387,695 B2
(45) Date of Patent: Jun. 17, 2008

(54) LAMINATED SHEET AND METHOD OF DESIGNING THE SAME, AND REAR PROJECTION SCREEN AND METHOD OF MANUFACTURING THE SAME

(75) Inventors: Ryuuichi Iwakawa, Niigata (JP); Kenji Yoneda, Niigata (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 492 days.

(21) Appl. No.: 10/886,567

(22) Filed: Jul. 9, 2004

(65) Prior Publication Data

US 2005/0044115 A1  Feb. 24, 2005

(30) Foreign Application Priority Data

Jul. 11, 2003  (JP) .............................. 2003-196045

(51) Int. Cl.
*B32B 41/00* (2006.01)
(52) U.S. Cl. .......................... 156/64; 156/99; 156/102; 156/297; 156/299
(58) Field of Classification Search ................. 156/64, 156/99, 102, 297, 299
See application file for complete search history.

(56) References Cited

FOREIGN PATENT DOCUMENTS

| JP | 7-248537 | 9/1995 |
| JP | 11-316305 | 11/1999 |
| JP | 2001-133886 | 5/2001 |
| JP | 2002-169224 | 6/2002 |

*Primary Examiner*—George Koch
(74) *Attorney, Agent, or Firm*—Oblon, Spivak, McClelland, Maier & Neustadt, P.C.

(57) ABSTRACT

The rear projection screen includes a laminated sheet having a multi-layered structure consisting of the n number (n is a natural number of three or above) of layers. In this laminated sheet, a difference in linear expansion coefficients is 5% or more between a layer having the maximum linear expansion coefficient and a layer having the minimum linear expansion coefficient. Further, a difference in elasticity is 10% or more between a layer having the maximum elasticity and a layer having the minimum elasticity. The curvature change rate $\epsilon$ (1/mm° C.) of the laminated sheet with respect to temperature satisfies $-7.0 \times 10^{-6} \leq \epsilon \leq 7.0 \times 10^{-6}$.

1 Claim, 5 Drawing Sheets

LAMINATED SHEET AND METHOD OF DESIGNING THE SAME, AND REAR PROJECTION SCREEN AND METHOD OF MANUFACTURING THE SAME

BACKGROUND OF THE INVENTION

1. Field of the Invention

The present invention relates to a laminated sheet and a method of designing the same, and a rear projection screen and a method of manufacturing the same.

2. Description of the Related Art

Rear projection screens are generally composed of a plurality of sheet-like members such as a lenticular lens sheet, Fresnel lens sheet, front panel, and so on. The screen market requires more light-weight, low-cost, and thin screens with fine pitch while having a wide display. Further, in order to offer more sophisticated features, the rear projection screens increasingly include a multi-layered structure in which Fresnel lenses, lenticular lenses, and front panels are each laminated together. Thus, thin screens having the multi-layered structure such as a double-layered lenticular lens, a double-layered Fresnel lens, and a front panel laminated with a film are currently dominant. A screen in which a front panel is laminated with a lenticular lens on an ambient light absorbing part (black stripe: BS) so as to reduce color shift to improve contrast is proposed in Japanese Unexamined Patent Application Publication 07-248537, for example. In addition, most lenticular lenses for a liquid crystal display or digital micromirror device (DMD) are used in combination with a front plate since they are too thin to be used in a single piece. For example, a lenticular lens for liquid crystal displays may be adhered, on a lenticular exit surface, to a front plate. The exit surface of a front plate may be coated with an antireflection film. Further, a multi-layered sheet may include a combination of two or more layers of which linear expansion coefficients are greatly different so as to previously curve the sheets, as disclosed in Japanese Unexamined Patent Application Publication 2001-133886, for example. The rear projection screens having various multi-layered structures have become widely used.

The rear projection screens including a combination of laminated films, however, have the following problems. When using a combination of films, lens sheets, and front panels made of different materials, the difference in the linear expansion coefficient of each material generates thermal stress as temperature changes. The thermal stress causes warpage to distort the lens. The focal point of the screen can thereby shift; in addition, the films can be separated. This leads to deterioration of image and picture quality of the rear projection screens. Though the focal point shifts to some extent when using a single-layer structure without combining different materials, the focal point shifts more greatly if using a multi-layered structure with combined materials, making the problem of image and picture quality deterioration more serious.

One way to prevent the laminated sheet of different materials from warpage deformation due to temperature changes is to adjust the ratio of the thickness of layers in such a way that layers other than the layer with highest rigidity are as thin as possible. If one layer is significantly thicker than the other layers, for example, deformation due to thermal stress can be reduced. Another way is to adjust the ratio of the elasticity of layers in such a way that there is a soft layer of which deformation force is negligible with respect to the layer with highest rigidity. Yet another way is to substantially equalize the linear expansion coefficients of layers. It is also possible to prevent the warpage due to the thermal stress by symmetrizing the structure of the laminated sheet in the thickness direction, though it imposes many restrictions on design, such as prohibition of use of different materials on two sides of the sheet. However, the above methods place strict conditions on thickness reduction or material selection and allow very low degree of design freedom, restricting the flexible change of composition, material, and thickness of layers. For example, changing the degree of elasticity involves changing the composition and material, which is undesirable since it causes a change in the optical characteristics or there is a limitation to the entire sheet thickness in some cases to make a thin screen.

Hence, conventional rear projection screens have the problem that deterioration of image and picture quality occurs with temperature changes.

SUMMARY OF THE INVENTION

In view of the foregoing, it is an object of the present invention to provide a rear projection screen capable of preventing deterioration of image and picture quality due to temperature changes, a method of manufacturing the screen, a laminated film, and a method of designing the film.

To these ends, according to one aspect of the present invention, there is provided a laminated sheet having a multi-layered structure composed of n (n is a natural number of three or above) number of layers which are asymmetric in a thickness direction, wherein a percentage of a linear expansion coefficient of a layer having a minimum linear expansion coefficient with respect to a linear expansion coefficient of a layer having a maximum linear expansion coefficient is 95% or less, an elasticity of each layer of the laminated sheet is 10000 MPa or less, and a percentage of an elasticity of a layer having a minimum elasticity with respect to an elasticity of a layer having a maximum elasticity is 90% or less, a ratio of a thickness of a layer having a maximum thickness with respect to a thickness of a layer having a minimum thickness is 200 or less, and a curvature change rate $\epsilon$ (1/mm° C.) of the laminated sheet with respect to a temperature change $\Delta K$ calculated by a simultaneous equation of Formula 1 satisfies: $-7.0 \times 10^{-6} \leq \epsilon \leq 7.0 \times 10^{-6}$ $$\varepsilon = \frac{\theta}{\Delta K}$$ Formula 1

$$T = \sum_{i=1}^{n} t_i$$

$$\int_0^T E(y)\{e(y) - e0 - \theta y\} dy = 0$$

$$\int_0^T E(y)\{e(y) - e0 - \theta y\} y \, dy = 0$$

$$e(y) = \alpha(y) \Delta K$$

where, $\theta$ indicates a curvature (1/mm) of the laminated sheet, $t_i$ indicates a thickness (mm) of a i-th layer (i=1, 2, ... n) of the laminated sheet, y is a distance (mm) in a thickness direction from one side surface to an opposite side surface of the laminated sheet when the one side surface is 0, $E(y)$ indicates an elasticity of the laminated sheet in y, $e_o$ indicates an expansion (dimensionless) of the laminated sheet in y=0 (mm), e(y) indicates a flexible expansion (dimensionless) of a material of the laminated sheet in y before laminating materials, and α(y) indicates a linear expansion coefficient (1/° C.) of a material of the laminated sheet in y. It is thereby possible to reduce warpage due to temperature changes.

The above laminated sheet is suitable for use in a rear projection screen. It is thereby possible to prevent deterioration of image and picture quality due to temperature changes.

According to another aspect of the present invention, there is provided a method of designing a laminated sheet having a multi-layered structure composed of n (n is a natural number of three or above) number of layers which are asymmetric in a thickness direction, the method comprising: (a) solving a simultaneous equation of Formula 2 for a curvature θ by eliminating $e_0$;

$$\varepsilon = \frac{\theta}{\Delta K}$$ Formula 2

$$T = \sum_{i=1}^{n} t_i$$

$$\int_0^T E(y)\{e(y) - e0 - \theta y\} dy = 0$$

$$\int_0^T E(y)\{e(y) - e0 - \theta y\} y\, dy = 0$$

$$e(y) = \alpha(y)\Delta K$$

where, θ indicates a curvature (1/mm) of the laminated sheet, $t_i$ indicates a thickness (mm) of a i-th layer (i=1, 2, ... n) of the laminated sheet, y is a distance (mm) in a thickness direction from one side surface to an opposite side surface of the laminated sheet when the one side surface is 0, E(y) indicates an elasticity of the laminated sheet in y, $e_0$ indicates an expansion (dimensionless) of the laminated sheet in y=0 (mm), e(y) indicates a flexible expansion (dimensionless) of a material of the laminated sheet in y before laminating materials, and α(y) indicates a linear expansion coefficient (1/° C.) of a material of the laminated sheet in y;

(b) calculating a curvature change rate ε as a function of an elasticity Ei, a layer thickness $t_i$, and a linear expansion coefficient $\alpha_i$ of each layer, based on the curvature θ given by Formula 2; and (c) determining an elasticity Ei, a layer thickness $t_i$, and a linear expansion coefficient $\alpha_i$ of each layer so that a curvature change rate ε satisfies: $-7.0 \times 10^{-6} \leq \varepsilon \leq 7.0 \times 10^{-6}$, wherein a percentage of a linear expansion coefficient of a layer having a minimum linear expansion coefficient with respect to a linear expansion coefficient of a layer having a maximum linear expansion coefficient is 95% or less, an elasticity of each layer of the laminated sheet is 1000 MPa or less, and a percentage of an elasticity of a layer having a minimum elasticity with respect to an elasticity of a layer having a maximum elasticity is 90% or less, a ratio of a thickness of a layer having a maximum thickness with respect to a thickness of a layer having a minimum thickness is 200 or less, and a curvature change rate ε (1/mm° C.) of the laminated sheet with respect to a temperature change ΔK calculated by a simultaneous equation of Formula 1 satisfies: $-7.0 \times 10^{-6} \leq \varepsilon \leq 7.0 \times 10^{-6}$ It is thereby possible to reduce warpage due to temperature changes.

According to another aspect of the present invention, there is provided a method of manufacturing a rear projection screen, comprising: manufacturing a laminated sheet designed by the design method according to claim 3; and setting the laminated sheet to a frame. It is thereby possible to prevent deterioration of image and picture quality due to temperature changes.

The present invention allows providing a rear projection screen capable of preventing deterioration of image and picture quality due to temperature changes, a method of manufacturing the screen, a laminated film, and a method of designing the film.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
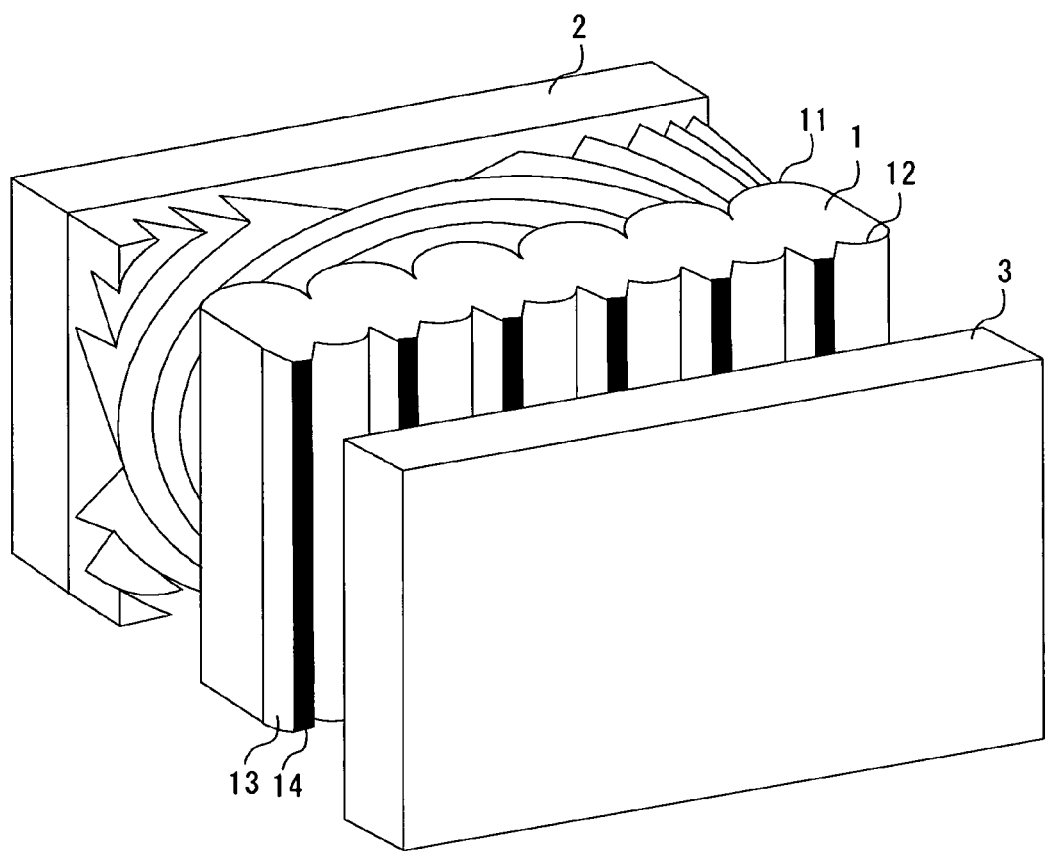
FIG. 1 is a perspective view showing the structure of a rear projection screen according to a specific embodiment of the present invention.

The structure of a rear projection screen according to a specific embodiment of the present invention is shown in FIG. 1. FIG. 1 is a perspective view of the rear projection screen having a lenticular lens sheet 1, Fresnel lens sheet 2, front panel 3, lenticular lens 11, light condensing part 12, light non-condensing part 13, and ambient light absorbing part 14. The rear projection screen is composed of the Fresnel lens sheet 2, lenticular lens sheet 1, and front plate 3 placed in this order from the light incident side.

Generally, the Fresnel lens sheet 2 has a sheet with a Fresnel lens consisting of a series of equally-spaced narrow concentric grooves formed on its light exit surface. The lenticular lens sheet 1 has a transmitting substrate with an array of lenticular lenses 11 formed on the light incident surface for receiving light from a light source. The light exit surface for releasing light of the lenticular lens sheet 1 includes the light condensing parts 12, and the light non-condensing parts 13 which are the surface area different from the light condensing parts 12. Each of the light condensing parts 12, where the light from the lenticular lenses 11 formed on the incident surface is focused, is usually shaped like a convex lens so as to enhance the diffusion of light in the horizontal direction.

Particularly, if the lenticular lens sheet 1 is used in combination with a three-tube CRT light source, it is important to shape the light condensing parts 12 like a convex lens in order to correct the shift of three colors. On the other hand, each of the light non-condensing parts 13, where the light from the lenticular lens 11 formed on the incident surface is not focused, has a raised shape consisting of a top surface parallel to the lenticular lens sheet 1 and side surfaces. The top surface and the upper side surfaces, which are the area of the side surfaces close to the top surface, are coated with the ambient light absorbing layer made of black paint and so on by means such as roll coating, screen printing, and transfer printing to form an ambient light absorbing part 14 (BS part) with a raised shape. This part allows reducing the ambient light entering the lenticular lens sheet 1 but reflected by the exit surface of the lenticular lens sheet 1 to return to the observer side, thereby enhancing image contrast.

Figure 2:
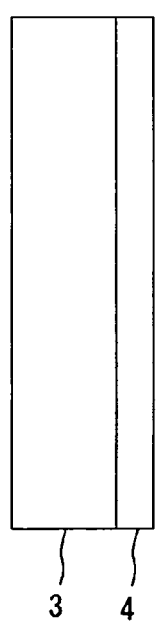
FIG. 2 is a side elevational view showing the structure of a front plate according to a specific embodiment of the present invention.

An example of the structure of the front plate 3 is shown in FIG. 2. FIG. 2 is a side elevational view of the front plate 3. An antistatic PET film 4 is adhered to the front face, in the observer side, of the front plate 3. The front plate 3 is made of Methyl methacrylate-Styrene monomer copolymer, which is referred to hereinafter as MS. The PET film 4 is made of Polyethylene Terephthalate, hereinafter as PET. The front plate 3 and the PET film 4 may be attached together with a light-cured adhesive. The structure to reduce warpage in such a double-layered structure is explained below. In this specification, a sheet consisting of two or more layers is called a laminated sheet.

Figure 3:
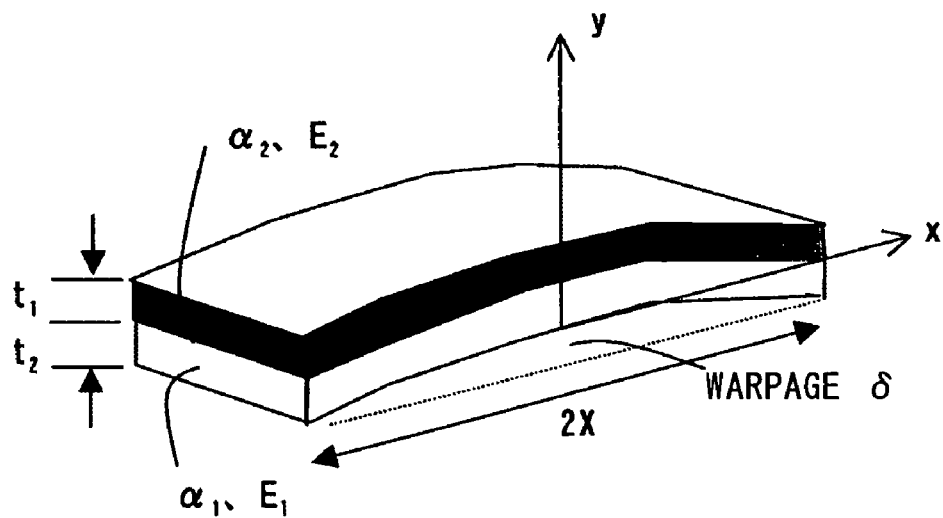
FIG. 3 is a perspective view showing a double-layered structure being warped.

First, stress and bending moment applied to a laminated sheet consisting of two or more (i number of) layers due to thermal stress are calculated. A case using a laminated sheet of two layers is explained here as the simplest example. For purposes of illustration, FIG. 3 shows a coordinate system, in which the sheet consisting of the first layer (material 1) and the second layer (material 2) placed on one another in the Y axis direction is located. The symbol F indicates stress per unit width (N/mm) applied to the laminated sheet due to thermal expansion, and M indicates bending moment per unit width (N mm/mm) applied to the laminated sheet due to thermal expansion. The symbol θ indicates curvature (1/mm) of the laminated sheet. The symbol $t_i$ indicates the thickness (mm) of the i-th layer (i=1, 2, . . . n) of the laminated sheet, and y is a distance (mm) in the thickness direction from one side surface to the opposite side surface of the laminated sheet when the one side surface is 0. E(y) indicates the degree of elasticity of the laminated sheet in y, and the degree of elasticity e0 indicates the degree of expansion (dimensionless) of the laminated sheet in y=0 (mm), e(y) indicates the degree of flexible expansion (dimensionless) of a material of the laminated sheet in y before lamination, and α(y) indicates the coefficient of linear expansion (1/° C.) of a material of the laminated sheet in y. Since E(y) and e(y) depend on materials, when the distance y from a reference (y=0) in the thickness direction is in the i-th layer, E(y)=Ei, and e(y)=ei. The stress and bending moment applied to the laminated sheet due to thermal stress are given by the following simultaneous equation:

$$F = \int_0^T E(y)\{e(y) - e0 - \theta y\} dy \quad \text{Formula 5}$$

$$M = \int_0^T E(y)\{e(y) - e0 - \theta y\} y \, dy$$

Figure 4:
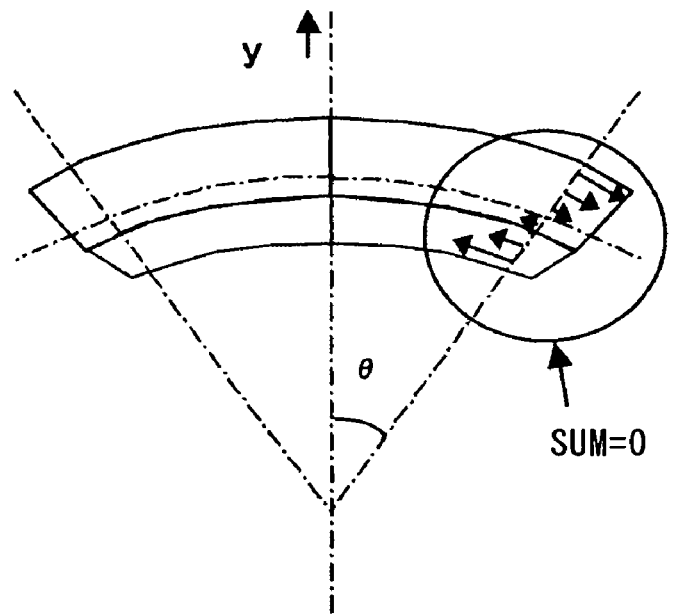
FIG. 4 is a sectional view showing the distribution of stress applied to a double-layered structure.
Figure 5:
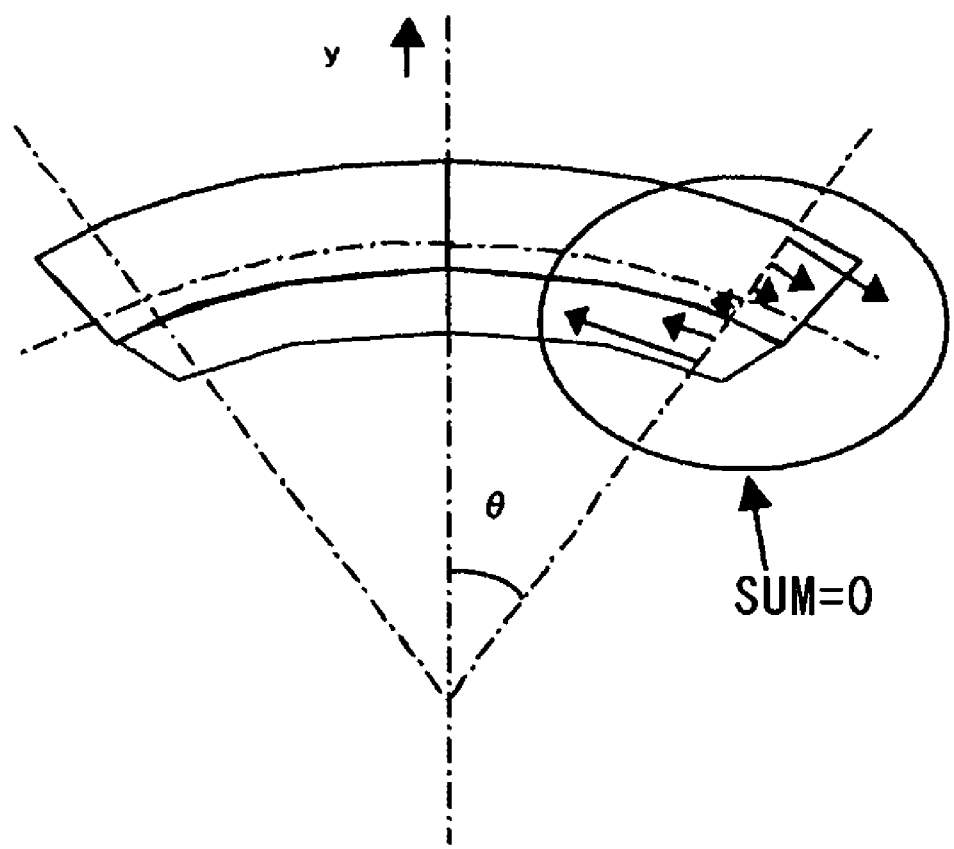
FIG. 5 is a sectional view showing the distribution of bending moment applied to a double-layered structure.

FIGS. 4 and 5 show the distributions of stress and bending moment applied to the laminated sheet of two layers. Integration of Formula 5 for y, assuming F=0 and M=0, which is the state with no external force applied, gives Formulas 6 and 7 below:

$$F = e_1 E_1 t_1 + e_2 E_2 t_2 - e_0 \times (E_1 t_1 + E_2 t_2) - (\theta/2) \times (E_1 \times t_2^2 - E_2 \times t_1^2 + E_2 \times (t_1+t_2)^2) = 0 \quad \text{Formula 6:}$$

$$M = ((e_1 E_1 \times t_1^2 - e_2 E_2 \times t_1^2 + e_2 E_2 \times (t_1+t_2)^2) - e_0 \times (E_1 \times t_1^2 - E_2 \times t_1^2 + e_2 \times (t_1+t_2)^2))/2 - (\theta/3) \times (E_1 \times t_1^3 - E_2 \times t_1^3 + E_2 \times (t_1+t_2)^3) = 0 \quad \text{Formula 7:}$$

In the simultaneous equations of Formulas 6 and 7, elimination of $e_0$ to solve for curvature θ gives the following formula:

$$\theta = -6 E_1 E_2 (e_1 - e_2) \times t_1 t_2 (t_1+t_2)/(E_1^2 t_1^4 + E_2^2 t_2^4 + 2 E_1 E_2 t_1 t_2 (2 t_1^2 + 3 t_1 t_2 + 2 t_2^2))) \quad \text{Formula 8:}$$

If the coefficient of linear expansion of the i-th layer is $\alpha_i$, flexible expansion $e_i$ caused by a temperature difference ΔK is represented as follows:

$$e_1 = \alpha_i \times \Delta K \quad \text{Formula 9:}$$

If a curvature change rate with respect to temperature is ε, ε=θ/ΔK. Given Formulas 8 and 9, ε is represented as follows:

$$\epsilon = -6 E_1 E_2 (\alpha_1 - \alpha_2) \times t_1 t_2 (t_1+t_2)/(E_1^2 t_1^4 + E_2^2 t_2^4 + 2 E_1 E_2 t_1 t_2 (2 t_1^2 + 3 t_1 t_2 + 2 t_2^2))) \quad \text{Formula 10:}$$

The curvature change rate ε is the value given by calculation unless otherwise noted in this specification.

The smaller the curvature change rate ε is, the lower the warpage caused by temperature changes. Thus, the ideal condition is ε=0, where, theoretically, no warpage occurs due to temperature changes. Since $t_1$, $t_2$, $E_1$, and $E_2$ are all positive constants, the condition ε=0 is satisfied only when $\alpha_1 = \alpha_2$. However, $\alpha_1$ and $\alpha_2$ are fixed values for each material, and $\alpha_1 = \alpha_2$ is normally not satisfied if the layers are made of different materials; thus, ε=0 is not possible. It is thus necessary to adjust the layer thickness, elasticity, and linear expansion coefficient so as to minimize the value of ε. Changing the elasticity or linear expansion coefficient, however, normally involves chancing materials, and it is difficult to greatly change the degree of elasticity or coefficient of linear expansion if there are restrictions on materials for optical design. If, on the other hand, the maximum thickness of a layer is limited to reduce the entire thickness, it is possible to reduce the curvature change rate ε by increasing a difference in the layer thickness. For example, if the thickness of MS is limited to 2 mm, the other layer, PET film, is formed to be as thin as possible to reduce the curvature change rate ε. The curvature change rates ε where the thickness of MS is fixed to 2 mm and the thickness of PED film is varied are shown in Table 1 below:

TABLE 1

|  | PET | MS | ε (1/mm ° C.) |
|---|---|---|---|
| Case 1 | 0.05 mm | 2.0 mm | 3.6 × 10$^{-6}$ |
| Case 2 | 0.10 mm | 2.0 mm | 6.5 × 10$^{-6}$ |

TABLE 1-continued

|  | PET | MS | ε (1/mm ° C.) |
|---|---|---|---|
| Case 3 | 0.20 mm | 2.0 mm | $1.1 \times 10^{-5}$ |
| Case 4 | 0.30 mm | 2.0 mm | $1.4 \times 10^{-5}$ |

Figure 6:
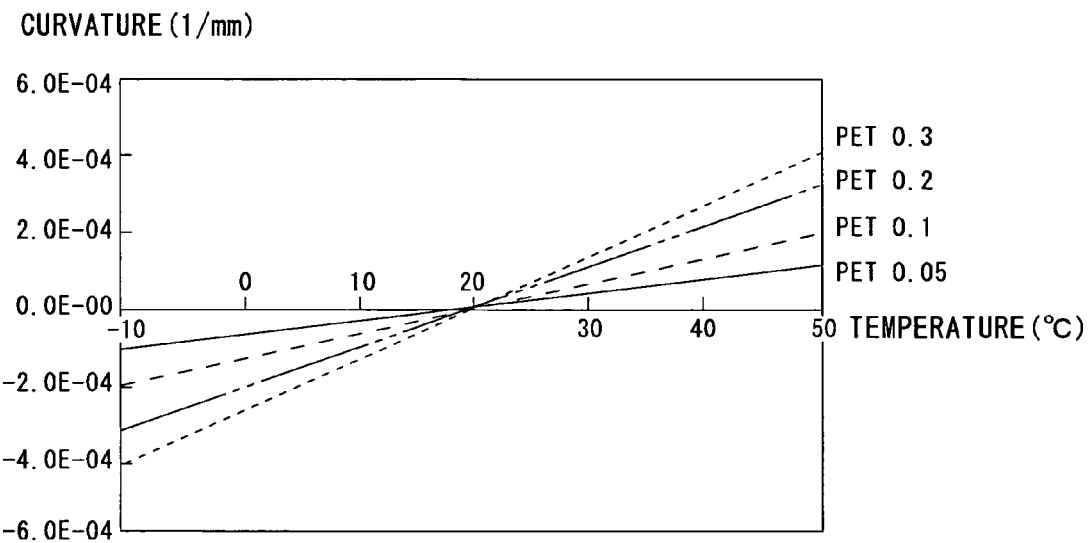
FIG. 6 is a graph showing the relationship between temperature and curvature of a front plate according to a specific embodiment of the present invention.

Table 1 shows calculation results of the curvature change rate ε when the thickness of the PET film is 0.05 mm, 0.1 mm, 0.2 mm, and 0.3 mm. In this calculation, the elasticity and linear expansion coefficient of PET are 4000 MPa and $3\times10^{-5}$ (1/° C.), and those of MS are 3000 MPa and $7\times10^{-5}$ (1/° C.). Under these four conditions, the curvature change rate ε is minimum when the PET film thickness is 0.05 mm, and maximum when it is 0.3 mm. FIG. 6 shows the relationship between temperature and curvature with this curvature change rate. The curvature when temperature is 20° C. is 0. As shown in the graph, the curvature change due to temperature changes is small when the PET film thickness is 0.05 mm, thus suppressing deterioration of image and picture quality.

In this manner, based on Formula 7, the inventors of this invention have found that the curvature change rate ε can be reduced by adjusting a combination of parameters of the linear expansion coefficient, thickness, and elasticity of each layer constituting the double-layered structure. It is therefore possible to reduce warpage by determining the linear expansion coefficient, thickness, and elasticity of each layer to reduce the curvature change rate ε. Even if there are restrictions on any of the linear expansion coefficient, thickness, and elasticity, it is possible to reduce warpage by comprehensively determining the values of the linear expansion coefficient, thickness, and elasticity. For example, in the case of laminating the materials having significantly different linear expansion coefficients, adjustment of thickness or elasticity allows a reduction of warpage due to temperature changes. Similarly, in the case where the maximum thickness of the laminated sheet is limited or the thickness of one layer is determined to produce a thin screen, a low curvature change rate ε can be obtained by adjusting other parameters. This method of designing and producing the sheet of rear projection screens allows the use of a combination of different materials, which has caused deterioration of image and picture quality.

A laminated sheet consisting of three layers in which a front plate laminated with a PET film is adhered to a lenticular lens is explained hereinafter with reference to FIG. 7. The same reference symbols as in FIGS. 1 and 2 designate the same elements. The entire structure of the rear projection screen is the same as in FIG. 1. In this embodiment, the front plate 3 laminated with the PET film 4 is attached to the ambient light absorbing part 14 of the lenticular lens sheet 1. A method of reducing warpage due to temperature changes in such a triple-layered structure is explained below.

Figure 7:
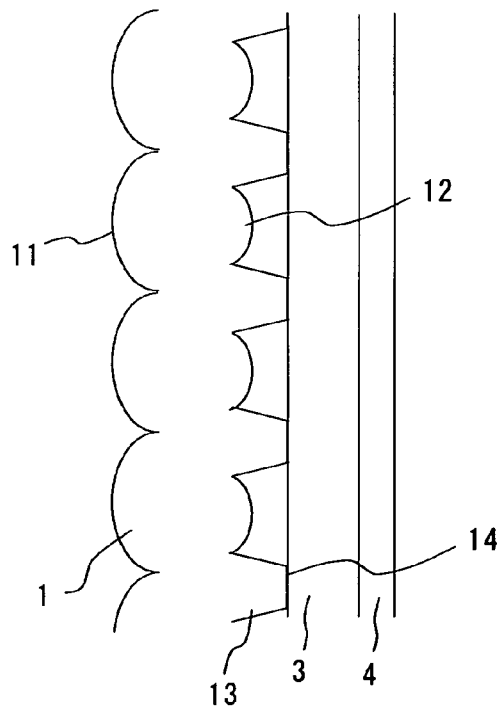
FIG. 7 is a sectional view showing the structure of a lenticular lens sheet according to a specific embodiment of the present invention.

The present invention allows preventing deterioration of image and picture quality due to warpage in the laminated sheet of three layers, as shown in FIG. 7, having different coefficients of thermal expansion, which is likely to cause deformation due to temperature changes. In the case of triple-layered structure also, the curvature θ is given by solving the simultaneous equation of Formula 5. The calculating formula for the triple-layered structure is as follows:

$$\theta = -6(E_1E_2(e_1-e_2)(t_1^2t_2+t_1t_2^2)+E_1E_3(e_1-e_3)(t_1^2t_3+2t_1t_2t_3+t_1t_3^2)+E_2E_3(e_2-e_3)(t_2^2t_3+t_2t_3^2))/(E_1^2t_1^4+E_2^2t_2^4+E_3^2t_3^4+2E_2E_3t_2t_3(2t_2^2+3t_2t_3+2t_3^2)+2E_1E_2t_1t_2(2t_1^2+3t_1t_2+2t_2^2)+2E_1E_3t_1t_3(2t_1^2+3t_1t_3+2t_3^2)+12E_1E_3t_1t_2t_3(t_1+t_2+t_3))$$

Formula 11:

Thus, given Formulas 9 and 11, the curvature change rate ε due to temperature changes is expressed by Formula 12 below as a function of the elasticity Ei, layer thickness $t_i$, and linear expansion coefficient $α_i$ of each layer.

$$\epsilon = -6(E_1E_2(α_1-α_2)(t_1^2t_2+t_1t_2^2)+E_1E_3(α_1-α_3)(t_1^2t_3+2t_1t_2t_3+t_1t_3^2)+E_2E_3(α_2-α_3)(t_2^2t_3+t_2t_3^2))/(E_1^2t_1^4+E_2^2t_2^4+E_3^2t_3^4+2E_2E_3t_2t_3(2t_2^2+3t_2t_3+2t_3^2)+2E_1E_2t_1t_2(2t_1^2+3t_1t_2+2t_2^2)+2E_1E_3t_1t_3(2t_1^2+3t_1t_3+2t_3^2)+12E_1E_3t_1t_2t_3(t_1+t_2+t_3))$$

Formula 12:

The elements of Formula 12 consist of a sum of three terms. Preferably, of the three terms, at least one term has a positive sign and at least one term has a negative sign. If an absolute value of the positive term (or a sum of two positive terms) and an absolute value of the negative term (or a sum of two negative terms) are substantially the same, a curvature change rate ε becomes low. It is thus possible to obtain a low curvature change rate ε by selecting a combination of materials that produce a low curvature change rate ε, determining their thicknesses, and then laminating the layers appropriately based on the selected materials and thickness. This allows preventing deterioration of image and picture quality due to temperature changes. To achieve such a suitable layered structure, there are nine parameters in total to be adjusted: three values, which are the linear expansion coefficient, thickness, and degree of elasticity, for each of the three layers. Hence, even if restrictions do not allow any of the parameters to change or greatly change, it is still possible to obtain a low curvature change rate ε by adjusting the other parameters.

Figure 8:
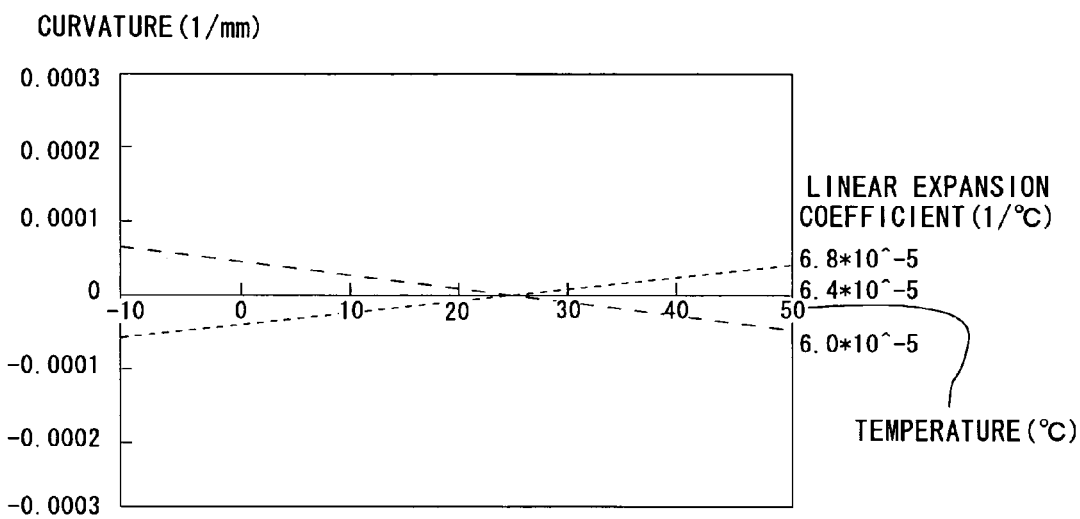
FIG. 8 is a graph showing the relationship between temperature and curvature of a lenticular lens sheet according to a specific embodiment of the present invention.

For example, a simulation result when the linear expansion coefficient of the lenticular lens 1 is varied in the laminated sheet, as shown in FIG. 7, having the front plate 3 of 2 mm in thickness, the PET film 4 of 0.05 mm, and the lenticular lens 1 of 0.7 mm is explained hereinafter with reference to FIG. 8. In this simulation, the physical values of the front panel 3 and the PET film 4 are the same as above, and the linear expansion coefficient of the lenticular lens 1 is varied from $6.0\times10^{-5}$, $6.4\times10^{-5}$, to $6.8\times10^{-5}$ (1/° C.). The lenticular lens 1 is made of MS, and the linear expansion coefficient is adjustable by MS mole fraction, degree of polymerization, degree of crystallinity, elastomer modification, various additives, and soon. The degree of elasticity may slightly change by the above adjustments. Though the present invention uses the above exact values of elasticity, the simulation shown in FIGS. 7 and 8 uses the elasticity of 3200 Mpa to simplify the explanation. FIG. 8 is a graph of the relationship between temperature and curvature with temperature (° C.) on the horizontal axis and curvature (1/mm) on the vertical axis. As shown in FIG. 8, the deformation due to temperature is substantially zero where the linear expansion coefficient of the lenticular lens 1 is $6.4\times10^{-5}$.

It is possible to reduce warpage by determining the linear expansion coefficient, thickness, and elasticity of each layer so as to obtain a low curvature change rate ε. Even if there are restrictions on any of the linear expansion coefficient, thickness, and elasticity, it is still possible to reduce warpage by comprehensively determining the values of the linear expansion coefficient, thickness, and degree of elasticity. This allows preventing deterioration of the image and picture quality of rear projection screens even with restrictions on thickness imposed to produce a thinner screen or restrictions on materials imposed by optical design.

The above method is more effective for triple-layered structures than for double-layered structures. Since the double-layered structures have fewer parameters to change for reduction of a curvature change rate, various restrictions may not allow sufficient reduction of warpage. The triple-layered structures, on the other hand, have more parameters to change, and a certain combination of parameters even allows the elements of Formula 12 to be zero, which theoretically eliminates warpage. The above method may be used not only for the double or triple layered structures, but also for four or more layered structures. In this case also, the curvature change rate $\epsilon$ can be calculated by solving the simultaneous equation of Formula 5 with F=0 and M=0 as is the case with the above embodiment. If the sheet consists of n number of layers, the number of parameters to reduce the curvature change rate $\epsilon$ increases to 3n, which is more advantageous. It is even possible to achieve the curvature change rate $\epsilon$ of 0 by appropriately adjusting a combination of these parameters.

The design method according to the present invention is applicable to a double-layered lenticular sheet, double-layered Fresnel, triple-layered Fresnel, multi-layered front panel, lenticular sheet laminated with a front panel, lenticular sheet laminated with a front panel having an antireflection film, and so on. The present invention, however, is not limited to the above applications, but is applicable to any laminated sheets consisting of layers made of different materials. It is also possible to count a bond or adhesive as one layer. The physical values of typical materials to be used for the sheet of rear projection screens are shown in Table 2 below;

TABLE 2

|  | Degree of Elasticity (MPa) | Linear Expansion Coefficient (1/° C.) |
| --- | --- | --- |
| PET | 4000 | $3 \times 10^{-5}$ |
| PC | 2500 | $7 \times 10^{-5}$ |
| PMMA | 3200 | $6 \times 10^{-5}$ |
| MS | 3000 | $7 \times 10^{-5}$ |
| Modified elastomer PMMA | 1700 to 3200 | 6 to $11 \times 10^{-5}$ |
| Modified elastomer MS | 1700 to 3000 | 3 to $11 \times 10^{-5}$ |

PC: Polycarbonate;
PMMA: Polymethylmethacrylate

Use of the above values allows design of the sheet with low warpage. Though Table 2 shows typical materials used for the sheet of rear projection screens, materials are not limited thereto. Further, FIG. 2 shows typical physical values of each material, but the same material does not necessarily have the above values. For example, if some additive is added to the above material, the physical value changes by the type or concentration of the additive. Though the above embodiments use the laminated sheet in which a plurality of layers are adhered together, the present invention is also applicable to a laminated sheet integrally formed by molding.

If the laminated sheet consists of layers made of materials having substantially the same linear expansion coefficient, the layers are equally expanded as temperature changes, and thus applied stress is small to cause no significant warpage. On the other hand, if the laminated sheet consists of layers made of materials having different linear expansion coefficients, the layers are not equally expanded, and applied stress is large to cause significant warpage. Thus, the above design method is effective for the laminated sheet including a combination of layers made of materials having different linear expansion coefficients. For example, the method is suitable for the laminated sheet in which a difference in linear expansion coefficients is 5% or more between a layer having the maximum linear expansion coefficient and a layer having the minimum linear expansion coefficient, that is, the laminated sheet in which $(\alpha_{max}-\alpha_{min})/\alpha_{max} \geq 0.05$ is satisfied when the linear expansion coefficient of the former layer is $\alpha_{max}$ and the linear expansion coefficient of the latter layer is $\alpha_{min}$. Use of a combination of different materials of which linear expansion coefficients differ by 5% or more for rear projection screens has been difficult if there are restrictions on the thickness and so on; however, the above method allows easy use of such materials.

If the degree of elasticity of each layer is substantially the same, bending stress applied to the laminated sheet is small, causing no significant warpage. Hence, the present invention is suitable for the laminated sheet including a combination of layers having different degrees of elasticity. For example, it is suitable for the laminated sheet in which a difference in elasticity is 10% or more between a layer having the maximum elasticity and a layer having the minimum elasticity, that is, the laminated sheet in which $(E_{max}-E_{min})/E_{max} \geq 0.1$ is satisfied when the elasticity of the former layer is $E_{max}$ and the elasticity of the latter layer is $E_{min}$. Use of a combination of different materials of which degrees of elasticity differ by 10% or more for rear projection screens has been difficult if there are restrictions on the thickness and so on; however, the above method allows easy use of such materials. The design method according to the present invention may be used for designing a laminated sheet composed of any materials, but it is preferred to be applied to the case where there are restrictions on the elasticity. Particularly, it has been difficult to use a material having the elasticity of 10000 MPa or less if there are restrictions on the thickness and soon; however, the above method allows easy use of such a material. It is thereby possible to reduce warpage due to temperature changes so as to prevent deterioration of picture quality.

Similarly, if the thickness of each layer is significantly different, bending stress applied to the laminated sheet is small, causing no significant warpage. Hence, the present invention is suitable for the laminated sheet including a combination of layers whose thickness is not very different form each other. For example, it is suitable for the laminated sheet in which the thickness ratio is 200 or less between a layer having the maximum thickness and a layer having the minimum thickness, that is, the laminated sheet in which $(t_{max}-t_{min})/t_{max} \geq 200$ is satisfied when the thickness of the former layer is $t_{max}$ and the thickness of the latter layer is $t_{min}$. Use of the laminated sheet including a combination of layers whose thickness ratio is 200 or less for rear projection screens has been difficult if there are restrictions on the thickness and so on; however, the above method allows easy use of such layers. Though there are no restrictions on the sheet thickness in the present invention, it is preferred to apply the invention to the case where the entire sheet thickness is, for example, 8 mm or less.

Further, it has been extremely difficult to use a combination satisfying two or more conditions of linear explanation coefficient, elasticity, and thickness that cause large warpage; however, this invention allows such a combination to be used easily. It is thereby possible to reduce warpage even using the laminated sheet having a combination of materials or thickness which have been caused large warpage, preventing deterioration of image and picture quality of rear projection screens.

The inventors of this invention have conducted various tests on the sheet of which curvature change rate $\epsilon$ is calculated by the above method and found that, if the curvature change rate $\epsilon$ (1/mm° C.) satisfies $-7.0 \times 10^{-6} \leq \epsilon \leq 7.0 \times 10^{-6}$, deterioration of image and picture quality is suppressed in spite of temperature changes occurring in actual use. Further, if the curvature change rate $\epsilon$ of the front plate. The size of the conventional sheet was 50 inches. Thus, the comparative example 1 is different from Example 1 in the materials of the lenticular sheet and the front plate.

Table 3 shows the simulation result and observation result on the physical values of the materials used in Example 1 and the comparative example 1.

TABLE 3

|  |  | Example 1 | | | Comparative Example 1 | | |
| --- | --- | --- | --- | --- | --- | --- | --- |
|  |  | Linear expansion coefficient ($\times 10^{-5}$/° C.) | Elasticity (MPa) | Thickness (mm) | Linear expansion coefficient ($\times 10^{-5}$/° C.) | Elasticity (MPa) | Thickness (mm) |
| PET |  | 3.0 | 3700 | 0.1 | 3.0 | 3700 | 0.1 |
| Front plate |  | 7.5 | 2400 | 2.0 | 6.4 | 3000 | 2.0 |
| Lenticular |  | 6.4 | 3000 | 0.7 | 7.5 | 2400 | 0.7 |
| $\epsilon$ | Simulation | $-0.064 \times 10^{-6}$ | | | $7.2 \times 10^{-6}$ | | |
| (1/mm ° C.) | Observation | $-0.2 \times 10^{-6}$ | | | $8.0 \times 10^{-6}$ | | | satisfies $-5.0 \times 10^{-6} \leq \epsilon \leq 5.0 \times 10^{-6}$, and more preferably, $-3.0 \times 10^{-6} \leq \epsilon \leq 3.0 \times 10^{-6}$, image and picture quality deterioration can be more suppressed to improve the display characteristics of rear projection screens. Te most preferred condition is, of course, $\epsilon = 0$. This invention allows selecting the materials and layer thickness to reduce the value of $\epsilon$. The examples of test results are described in the following examples.

The curvature change rate $\epsilon$ of a screen decreases when the screen is set to a frame of a display. Since the above curvature change rate $\epsilon$ is the value before setting the screen to the frame, if the curvature change rate of the screen after it is set to the frame is $\epsilon f$ (1/mm° C.), the relationship of $\epsilon$ and $\epsilon f$ are normally: $\epsilon / \epsilon f = 2$ to 5. Thus, if $\epsilon / \epsilon f = 2$, it is necessary to satisfy $-3.5 \times 10^{-6} \leq \epsilon f \leq 3.5 \times 10^{-6}$, preferably $-2.5 \times 10^{-6} \leq \epsilon f \leq 2.5 \times 10^{-6}$, and more preferably $-1.5 \times 10^{-6} \leq \epsilon f \leq 1.5 \times 10^{-6}$. Although the above embodiments have been explained in conjunction with a difference in the linear expansion coefficients, which is a difference in expansion coefficients due to temperature, the present invention may be applied also to the case with a difference in expansion coefficients due to moisture absorption.

EXAMPLE 1

An evaluation of the sheet manufactured according to the above embodiment to reduce warpage and a conventional sheet was conducted under varying ambient temperature. The sheet used in this example had a combination of a front plate made of modified elastomer MS of 2 mm in thickness of which linear expansion coefficient and elasticity have been adjusted to yield smaller warpage, an antistatic-treated PET film of 100 µm in thickness adhered to one side of the front plate with a light-cured adhesive, and a MS lenticular with 0.52 mm pitch having light non-condensing parts adhered to the other side of the front plate. The size of the sheet was 50 inches.

On the other hand, the conventional sheet used as the comparative example had a combination of a front plate made of MS of 2 mm in thickness, an antistatic-treated PET film of 100 µm in thickness adhered to one side of the front plate with a light-cured adhesive, and a MS lenticular with 0.52 mm pitch made mainly of modified elastomer MS having light non-condensing parts adhered to the other side As shown in Table 3, the curvature change rate of Example 1 was significantly lower than the curvature change rate of the comparative example 1.

The lenticular laminated with the front plate was then set to a CRT rear projection TV and an evaluation is conducted under varying ambient temperatures from 0° to 40° C. A Fresnel lens sheet was placed on the rear surface side (incident surface side) of the sheet and a separation distance of the lenticular from the Fresnel lens sheet in the center part of the screen was measured. The Fresnel lens sheet used in this test was made of a single material, of which deformation in the center part under 0° to 40° C. was 0 mm. After visual evaluation of deterioration of image and picture quality, the sheet was removed from the TV set and its curvature change rate was measured.

The separation distance of the lenticular from the Fresnel under the temperature range of 0° to 40° C. was −0.5 mm in Example 1. The visual evaluation found no deterioration of image and picture quality such as color shift and decreased resolution. In the comparative example, on the other hand, the separation distance of the lenticular from the Fresnel under the temperature range of 0° to 40° C. was 20 mm, and the visual evaluation found image deterioration such as significant decrease in resolution and coloring. The observed value of the curvature change rate after removal from the TV set was $8.0 \times 10^{-6}$, which was almost the same as the calculated value. Thus, the rear projection screen capable of preventing image and picture quality deterioration due to temperature changes was successfully obtained by the above design method to use the front panel having a double-layered structure and change the materials of the layers.

EXAMPLE 2

An evaluation of the rear projection screen manufactured by the above method was conducted to check deterioration of image and picture quality due to temperature changes. A lenticular film of 175 mm in thickness having a cylindrical lens formed by extrusion was adhered to one side of a front plate made of MS having the thickness of 2 mm and containing a diffusion agent with a light-cured adhesive. Further, an antireflection film (AR film) of 0.1 mm in thickness was adhered to the other side (exit side) of the front plate, thereby producing a LCD rear projection screen having a combination of the lenticular, front plate, and AR film. The simulation result showed that the curvature change rate $\epsilon$ of the screen sheet was $3.0 \times 10^{-6}$ (1/mm° C.). Table 4 shows the simulation result and observation result on the physical values of the materials used in Example 2.

TABLE 4

|  |  | Example 2 | | |
| --- | --- | --- | --- | --- |
|  |  | Linear expansion coefficient ($\times 10^{-5}$/° C.) | Elasticity (MPa) | Thickness (mm) |
| AR film |  | 3.0 | 3700 | 0.1 |
| Front plate |  | 11.0 | 1900 | 2.0 |
| Lenticular |  | 6.4 | 3000 | 0.175 |
| $\epsilon$ (1/mm ° C.) | Simulation |  | $3.0 \times 10^{-6}$ | |
|  | Observation |  | $2.6 \times 10^{-6}$ | |

This screen was then set to a LCD rear projection TV to check if a focus position shifts under varying ambient temperatures from 0° to 40° C. and visually evaluate if image quality deteriorates. After that, the screen was removed from the TV set and its curvature change rate was measured. The focal point did not shift under the temperature range from 0° to 40° C., proving that it is a suitable screen with no image deterioration. The observed value of the curvature change rate was $2.6 \times 10^{-6}$ (1/mm° C.), which was substantially the same as the calculated value. In this way, the rear projection screen with smaller warpage due to temperature changes capable of preventing image and picture quality deterioration was successfully obtained.

EXAMPLE 3

Figure 9A:
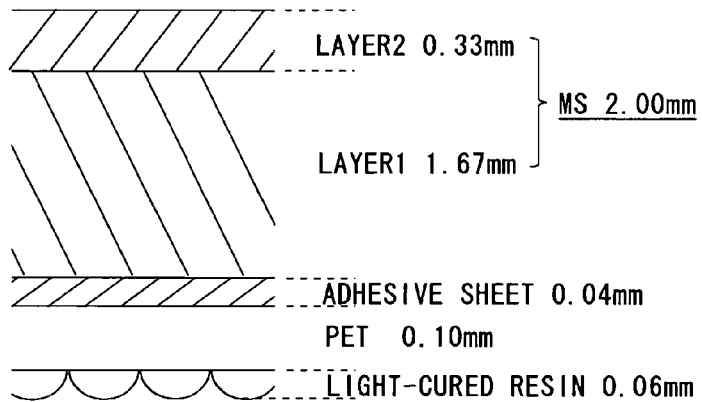
FIG. 9A is a sectional view showing the structure of a laminated sheet according to a third example of the present invention.
Figure 9B:
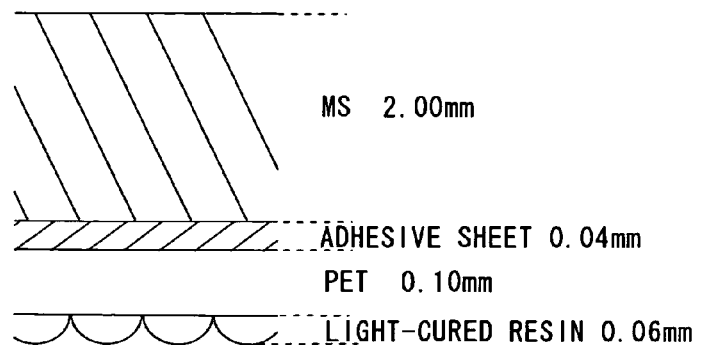
FIG. 9B is a sectional view showing the structure of a laminated sheet according to a comparative example of the present invention.

The case of using a sheet of four or more layered structure, different from the triple-layered structure used in Examples 1 and 2, to reduce warpage is explained hereinafter with reference to FIGS. 9A and 9B. FIGS. 9A and 9B are sectional views showing the structures of Example 3 and a comparative example 3, respectively. In Example 3, a PET film of 0.1 mm in thickness was used as a substrate, which is coated with a light-cured resin, and a cylindrical lens is formed thereon by light-curing reaction, thereby forming a lenticular lens sheet. On the lenticular lens sheet, a double-layered front panel of 2 mm in thickness was adhered with an adhesive sheet. The laminated sheet consisting essentially of five layers constitutes a LCD screen with 50 inches in size. The structure of the double-layered front panel of this laminated sheet was altered to reduce warpage due to temperature changes by using the above method. In this example, the first layer of the double-layered front panel was 1.67 mm in thickness, and the second layer was 0.33 mm in thickness.

The sheet used in the comparative example 3 had the same structure except for the front panel having a single-layer structure of 2 mm in thickness. Thus, the thickness of the laminated sheet was the same between Example 3 and the comparative example 3. The laminated sheet consisting essentially of four layers constitutes a LCD screen with 50 inches in size, which is the comparative example 3. Table 5 shows the physical values of the materials used in Example 3 and the comparative example 3 and the simulation result.

TABLE 5

|  | Example 3 | | | Comparative Example 3 | | |
| --- | --- | --- | --- | --- | --- | --- |
|  | Linear expansion coefficient ($\times 10^{-5}$/° C.) | Elasticity (MPa) | Thickness (mm) | Linear expansion coefficient ($\times 10^{-5}$/° C.) | Elasticity (MPa) | Thickness (mm) |
| Light-cured resin | 10.0 | 20 | 0.06 | 10.0 | 20 | 0.06 |
| PET | 3.0 | 3700 | 0.10 | 3.0 | 3700 | 0.10 |
| Adhesive sheet | 12.5 | 10 | 0.04 | 12.5 | 10 | 0.04 |
| Layer 1 of Front plate | 9.3 | 2100 | 1.67 | 6.4 | 2100 | 1.67 |
| Layer 1 of Front plate | 6.4 | 3000 | 0.33 |  |  |  |
| $\epsilon$ (1/mm ° C.) Simulation | $-0.13 \times 10^{-6}$ | | | $5.3 \times 10^{-6}$ | | |

While the calculated result of the curvature change rate $\epsilon$ of Example 3 was $-0.13 \times 10^{-6}$ (1/mm° C.), that of the comparative example 3 was $5.3 \times 10^{-6}$ (1/mm° C.). This means that, even if there are restrictions on the materials or thickness of the lenticular lens sheet or the front plate, it is possible to suppress warpage due to temperature changes by making a specific layer have a multi-layered structure made of materials having different physical properties and adjusting the thickness ratio or physical properties, thereby preventing image and picture quality deterioration.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of designing and manufacturing a laminated sheet having a multi-layered structure composed of n (n is a natural number of three or above) number of layers which are asymmetric in a thickness direction, the method comprising:

(a) solving a simultaneous equation of a formula for a curvature θ by eliminating $e_0$ as follows;

$$\varepsilon = \frac{\theta}{\Delta K}$$

$$T = \sum_{i=1}^{n} t_i$$

$$\int_0^T E(y)\{e(y) - e0 - \theta y\} dy = 0$$

$$\int_0^T E(y)\{e(y) - e0 - \theta y\} y \, dy = 0$$

$$e(y) = \alpha(y) \Delta K$$

where,

θ indicates a curvature (1/mm) of the laminated sheet, $t_i$ indicates a thickness (mm) of a i-th layer (i=1,2, ... n) of the laminated sheet, y is a distance (mm) in a thickness direction from one side surface to an opposite side surface of the laminated sheet when the one side surface is 0, E(y) indicates an elasticity of the laminated sheet in y, $e_0$ indicates an expansion (dimensionless) of the laminated sheet in y=0 (mm), e(y) indicates a flexible expansion (dimensionless) of a material of the laminated sheet in y before laminating materials, and α(y) indicates a linear expansion coefficient (1/° C.) of a material of the laminated sheet in y;

(b) calculating a curvature change rate ε as a function of an elasticity Ei, a layer thickness $t_i$, and a linear expansion coefficient $\alpha_i$ of each layer, based on the curvature θ given by Formula 2; and (c) determining an elasticity Ei, a layer thickness $t_i$, and a linear expansion coefficient $\alpha_i$ of each layer so that a curvature change rate ε satisfies: $-7.0 \times 10^{-6} \leq \varepsilon \leq 7.0 \times 10^{-6}$, wherein a percentage of a linear expansion coefficient of a layer having a minimum linear expansion coefficient with respect to a linear expansion coefficient of a layer having a maximum linear expansion coefficient is 95% or less, an elasticity of each layer of the laminated sheet is 10000 MPa or less, and a percentage of an elasticity of a layer having a minimum elasticity with respect to an elasticity of a layer having a maximum elasticity is 90% or less, a ratio of a thickness of a layer having a maximum thickness with respect to a thickness of a layer having a minimum thickness is 200 or less, and a curvature change rate ε (1/mm° C.) of the laminated sheet with respect to a temperature change ΔK calculated by a simultaneous equation of Formula 1 satisfies: $-7.0 \times 10^{-6} \leq \varepsilon \leq 7.0 \times 10^{-6}$;

(d) producing the laminated sheet based upon said curvature change rate, said elasticity and said linear expansion coefficient determined for each said layer.

\* \* \* \* \*